United States Patent [19]
Doi et al.

[11] Patent Number: 4,737,183
[45] Date of Patent: Apr. 12, 1988

[54] BOTTLE MANUFACTURING APPARATUS

[75] Inventors: Hiromitsu Doi, Nishinomiya; Keiji Arita, Tsukui, both of Japan

[73] Assignee: Yamamura Glass Co., Ltd., Hyogo, Japan

[21] Appl. No.: 35,938

[22] Filed: Apr. 8, 1987

[30] Foreign Application Priority Data

Apr. 18, 1986 [JP] Japan .............................. 61-58898[U]

[51] Int. Cl.$^4$ ............................................... C03B 9/00
[52] U.S. Cl. ....................................... 65/260; 65/241; 92/85 A
[58] Field of Search ........................ 65/239, 241, 260; 92/85 A, 85B

[56] References Cited

U.S. PATENT DOCUMENTS

| | | | |
|---|---|---|---|
| 4,162,911 | 7/1979 | Mallory | 65/260 X |
| 4,255,177 | 3/1981 | Fenton | 65/260 X |
| 4,298,373 | 11/1981 | Mumford et al. | 65/260 |
| 4,525,195 | 6/1985 | Foster | 65/260 |

Primary Examiner—Robert L. Lindsay

Attorney, Agent, or Firm—Wenderoth, Lind & Ponack

[57] ABSTRACT

A bottle manufacturing apparatus has a plurality of exchangable blow molds each having a bottom plate, a plurality of take-out mechanisms for taking a bottle formed in a corresponding blow mold out of the blow mold, a bottom plate height adjuster for each blow mold and each having an operating shaft for driving the height adjuster; a take-out mechanism height adjuster for each of the take-out mechanisms and each having an operating shaft for driving the height adjuster; a single driving shaft rotatable in opposite directions to first and second driving positions; and a plurality of rotating driving mechanisms connected between the driving shaft and the respective operating shafts, the driving mechanisms being in disengaged condition when the driving shaft is in a neutral position, and the driving mechanisms for the operating shafts of the bottom plate height adjusters being engaged when the driving shaft is in the first driving position and the driving mechanisms for the operating shafts of the take-out mechanism height adjusters being engaged when the driving shaft is in the second driving position.

6 Claims, 5 Drawing Sheets

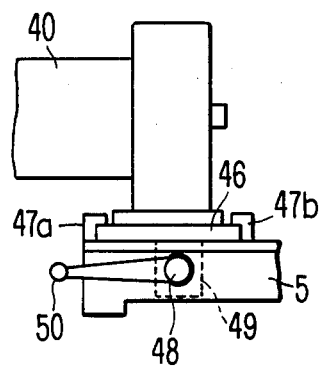
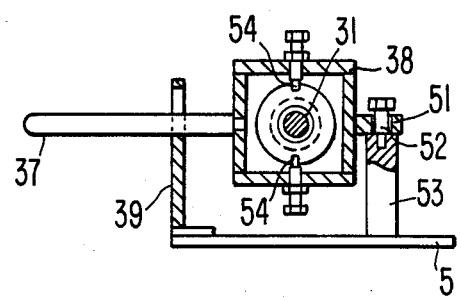
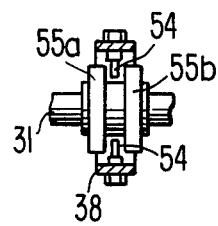
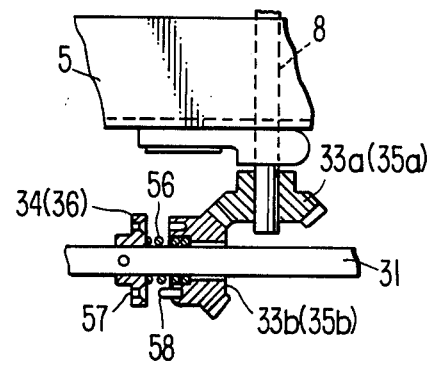
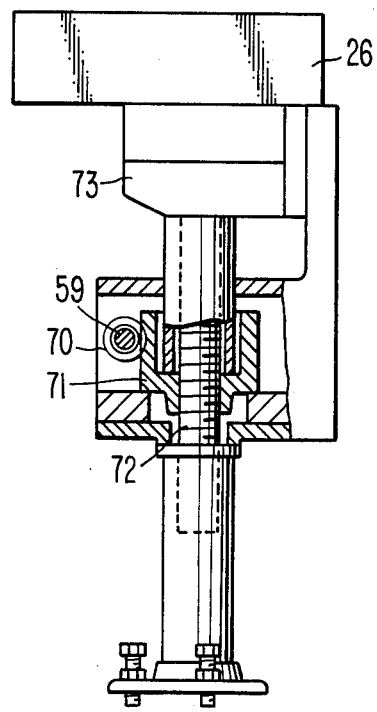

BOTTLE MANUFACTURING APPARATUS

The present invention relates to a bottle manufacturing apparatus, and more particularly to a device for adjusting the height of the bottom plate of the blow mold thereof and the height of the mechanism for taking a bottle molded in said blow mold out of the blow mold.

BACKGROUND OF THE INVENTION AND PRIOR ACT

A prior art bottle manufacturing apparatus has, as shown in FIGS. 12 and 13, a blow mold 1 composed of a pair of separate and movable mold parts 2a and 2b and a bottom plate 3 held between the bottom portions of said mold parts. The bottom plate 3 is mounted on a bracket 6 mounted on a body 5 of the bottle manufacturing apparatus, and the bracket 6 is slidable in the up and down direction quided by a slide-holding mechanism 4 such as a dovetail groove. Reference numeral 7 designates a threaded shaft for driving the bracket 6 and shaft 7 is rotatably mounted on said body 5 of the apparatus. Reference numeral 8 designates an operating shaft extending at right angles to the shaft 7, reference numeral 9 designating a rotating driving mechanism comprising a worm, a worm gear and the like for transmitting the rotation of said operating shaft 8 to the threaded shaft 7.

Reference numeral 10 designates an air cylinder slidably mounted on said body 5 of the apparatus for movement in the up and down direction, and a support member 11 is fixedly mounted on the cylinder 10 and extends upwardly therefrom, said support member 11 being provided with a supporting shaft 12 extending transversely thereto, and a tong arm 13 is pivoted on said supporting shaft 12 at one end portion thereof. This assembly is a take-out mechanism 14 for taking a bottle A molded in said blow mold 1 out of the blow mold 1.

Said tong arm 13 is provided with a tong head 16 rotatably mounted on a shaft 15 at the other end thereof from shaft 12, and a chain 18 extends around a sprocket wheel 17a fixedly mounted on said supporting shaft 12 and a sprocket wheel 17b supported by the shaft 15 and on which the tong head 16 is fixedly mounted. A gear 19 is fixedly mounted on the tong arm 13. A rack 20 is engaged with the gear 19 and is moved up and down by means of a piston 10a in said air cylinder 10. Tongs 21 are mounted on the tong head 16 and adapted to grip a mouth portion of the bottle A molded in the blow mold 1 and then to release it.

Reference numeral 22 designates a threaded shaft engaged with the air cylinder 10 and rotatable on said body 5 of the apparatus. An operating shaft 24 drives the threaded shaft 22 through a rotary driving mechanism 25 comprising a worm, a worm gear and the like. A conveyor device 26 transfers a molded bottle away from beneath the take-out mechanism 14.

With the above described construction, upon finishing the molding of the bottle in the blow mold 1, the rack 20 is moved down by means of the piston 10a in the air cylinder 10 to rotate the gear 19 counterclockwise. Since the gear 19 is fixedly mounted on the tong arm 13, the tong arm 13, which normally has the free end over the conveyor 26, is rotated by about 180° so that the free end is over blow mold 1. At this time, since the supporting shaft 12 is not rotated, the sprocket wheel 17a fixedly mounted on the supporting shaft 12 holds the sprocket wheel 17b together with the tong head 16 in the same direction as shown in FIG. 12 by the chain 18, and the tong head 16 is moved to a position above the mold 1, and the mouth portion of the bottle A is gripped between the tongs 21 thereof.

Subsequently, the piston 10a of the air cylinder 10 is driven to turn the gear 19 in the reverse direction by means of the rack 20 to move the tong arm 13 to the position above the conveyor 26, and the bottle between the tongs 21 is released and placed on the conveyor device 26.

In the event that the blow mold 1 is changed to change the kind of bottle to be manufactured, the bottom plate 3 of the new blow mold 1 is mounted on the bracket 6. The operating shaft 8 is rotated to move the bracket 6 up or down, thereby adjusting the height of the bottom plate 3 so as to be suitable for the mold parts 2a and 2b. In addition, the threaded shaft 22 is rotated by means of operating shaft 24 to move the air cylinder 10 up or down, thereby adjusting the height of the tongs 21 so it is suitable for holding the mouth portion of the different bottle A molded in the blow mold 1.

Thus it will be seen that it is necessary to adjust the heights of both the bottom plate 3 and the tongs 21 according to the kind of blow mold 1 when the blow mold 1 is changed in the bottle manufacturing apparatus, and that they have been adjusted by directly rotating the operating shafts 8 and 24 for adjusting the heights of both the bottom plate 3 and the tongs 21. This rotation has heretofore been performed by an operator separately using a tool, such as a spanner, or a nut runner or the like. The height of the bottom plate 3 has been set visually in relation to the mold parts 2a and 2b, while the height of the tongs 21 is visually set so as to be suitable for holding the mouth portion of the bottle A. Moreover, the operating shafts 8 and 24 are positioned at an end portion of the bottle manufacturing apparatus and the conveyor device 26 is positioned over the operating shafts 8 and 24.

Accordingly, in order to rotate the operating shafts 8 and 24, it is necessary for the operator to enter the space under the conveyor device 26, so that the working conditions are bad and the positions of the bottom plate 3 and the tongs 21 are difficult to observe. Thus, a problem occurs in that the adjusting of the heights of bottom plate 3 and the tongs 21 takes a considerably long time. Moreover, since it is necessary for the operating shafts 8 and 24 to be rotated separately for every different blow mold 1, in a bottle manufacturing apparatus in which a large number of different blow molds 1 are used, because it takes a considerably long time to adjust the heights of the bottom plate 3 and the take-out mechanism 14, it takes a long time to exchange molds in the bottle manufacturing apparatus.

OBJECTS AND BRIEF SUMMARY OF THE INVENTON

It is an object of the present invention to provide a bottle manufacturing apparatus in which the rotation of the operating shafts is improved and a plurality of operating shafts can be rotated simultaneously, thereby remarkably shortening the time required for adjusting the height of the bottom plate and the take-out mechanism.

In order to achieve the above described object, in a bottle manufacturing apparatus according to the present invention having a blow mold and a take-out mechanism for taking a bottle formed in said blow mold out of the blow mold, both of which are adapted to be individually movable up and down for adjustment of the height, the operating shaft for adjusting the height of the bottom plate of said blow mold and the operating shaft for adjusting the height of said take-out mechanism are provided with a driving shaft detachably connected to said operating shafts, through a rotary driving mechanism and rotatable in either the forward or the reverse direction, respectively, whereby each of said operating shafts can be individually rotated by means of said driving shaft.

BRIEF DESCRIPTION OF THE DRAWINGS

A preferred embodiment of the present invention will now be described in connection with the accompanying drawings, in which:

FIG. 7 is a front view of the motor portion of FIG. 6;

FIG. 8 is a side sectional view of a lever portion;

FIG. 9 is a front sectional view of the lever portion of FIG. 8;

FIG. 10 is a sectional view of a clutch portion;

FIG. 11 is a side view of a threaded shaft portion of a conveyor device;

DESCRIPTION OF THE PREFERRED EMBODIMENT

The preferred embodiment of a bottle manufacturing apparatus according to the present invention is shown in FIGS. 1 to 11.

Figure 12:
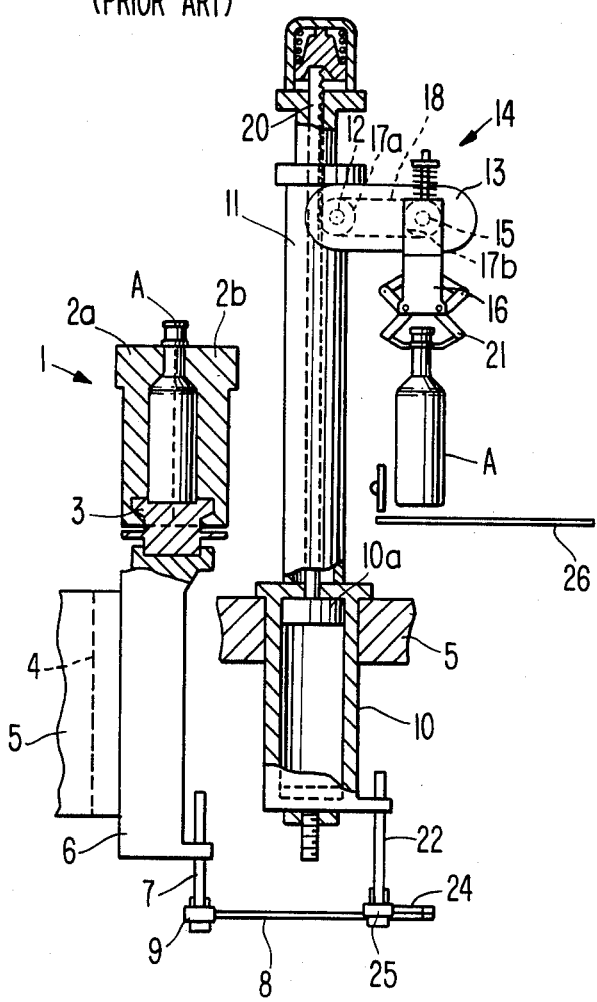
FIG. 12 is a front view of a conventional bottle manufacturing apparatus.
Figure 13:
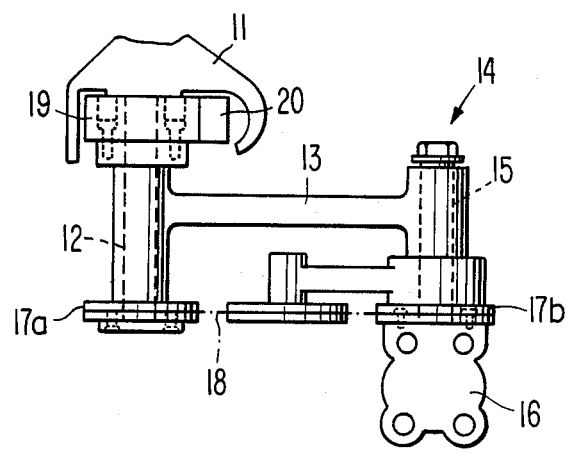
FIG. 13 is a plan view of a part of the apparatus of FIG. 12.

Since in FIGS. 1 to 11 reference numerals 1 to 26 designate the same parts as in the conventional apparatus described hereinbefore with reference to FIGS. 12 and 13, a detailed description of these parts will not be repeated. It is noted, however, that in the apparatus shown in FIGS. 1 to 11, there are a plurality of side by side blow molds 1 and take-out mechanisms 14 each with the two operating shafts 8 and 24 extending out from beneath the edge of conveyor 26 which runs past the blow molds 1.

Reference numeral 31 designates a horizontal driving shaft connected to the ends of the respective pairs of operating shafts 8 and 24 and extending in a direction at right angles to shafts 8 and 24 and mounted on the body 5 of the apparatus in bearings 32 so as to be slidable in the direction of the length thereof. A bevel gear 33a is fixedly mounted on the free end of each operating shaft 8, and a bevel gear 33b is idly rotatably mounted on driving shaft 31 at a position corresponding to each bevel gear 33a and is engaged with each bevel gear 33a. A clutch 34 is fixedly mounted on the driving shaft 31 at the position of each bevel gear 33b for engaging the corresponding bevel gear 33b with and disengaging it from the driving shaft 31 when the driving shaft 31 is moved in one direction. A bevel gear 35a is fixedly mounted on the free end of each operating shaft 24, and a bevel gear 35b is idly rotatably mounted on the driving shaft 31 at a position corresponding to each bevel gear 35a and is engaged with each bevel gear 35a. A clutch 36 is fixedly mounted on the driving shaft 31 at the positions of each bevel gear for engaging the corresponding bevel gear 35b with and disengaging it from the driving shaft 31 when the driving shaft 31 is moved in the opposite direction.

A lever 37 has fixedly mounted thereon a fixture 38, and has one end swingably mounted on the body 5 of the apparatus. The driving shaft 31 is held in fixture 38 and can be slid in the direction of the axis of the shaft by swinging the lever 37. A holder 39 is provided which is adapted to hold the lever 37 at a desired position by selectively inserting the lever 37 into one of three recesses 39a, 39b and 39c formed therein (see FIG. 4).

A motor 40 is provided which has a driving gear 42 mounted on the shaft 41 thereof. A first connecting shaft 43 is mounted on the body 5 of the apparatus substantually in line with the driving shaft 31 and the driving shaft 31 has a connecting end portion 31a having a square cross-section inserted into a square cross-section access 44 on one end portion of the driving shaft 43 so as to be rotated by the driving shaft 43 and slidable in the direction of the axis of the shaft 31 (see FIG. 5). A driven gear 45 is mounted on the other end of the driving shaft 43 so as to be engageable with said driving gear 42.

Figure 6:
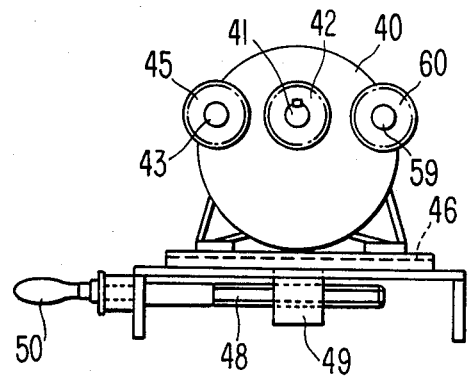
FIG. 6 is a side view of a motor portion.

Said motor 40 is mounted on a support plate 46, as shown in FIGS. 6 and 7, said support plate 46 being held by guide rails 47a and 47b along the end edges on both sides thereof and mounted on the body 5 of the apparatus so the support plate is slidable transversely of the driving shaft 43. A threaded shaft 48 rotatably mounted on the body 5 of the apparatus and extending transversely of the driving shaft 43 is threaded through a nut member 49 fixedly mounted on the support plate 46 and the threaded shaft 48 has a handle 50 thereon for rotating the threaded shaft 48 to move the plate 46 and thus to reciprocate the motor 40 to engage the driving gear 42 with and disengage it from the driven gear 45.

Said fixture 38 has a frame-like shape and the one end of lever 37 projecting from the side thereof is pivotally mounted on a support member 53, which is mounted on the body 5 of the apparatus, by means of a pin 52 extending through a fixture hole 51 formed in the one end of the lever 37, so the lever is both swingable and movable up and down, as shown in FIGS. 8 and 9. Engaging pins 54 projecting from opposite positions on the inner side of the fixture 38 project into a space between a pair of bearings 55a and 55b mounted on the driving shaft 31 in spaced apart relation. Accordingly, when the fixture 38 is swung in the direction of the length of shaft 31 by means of the lever 37, the driving shaft 31 is caused to slide in the direction of its length.

Figure 1:
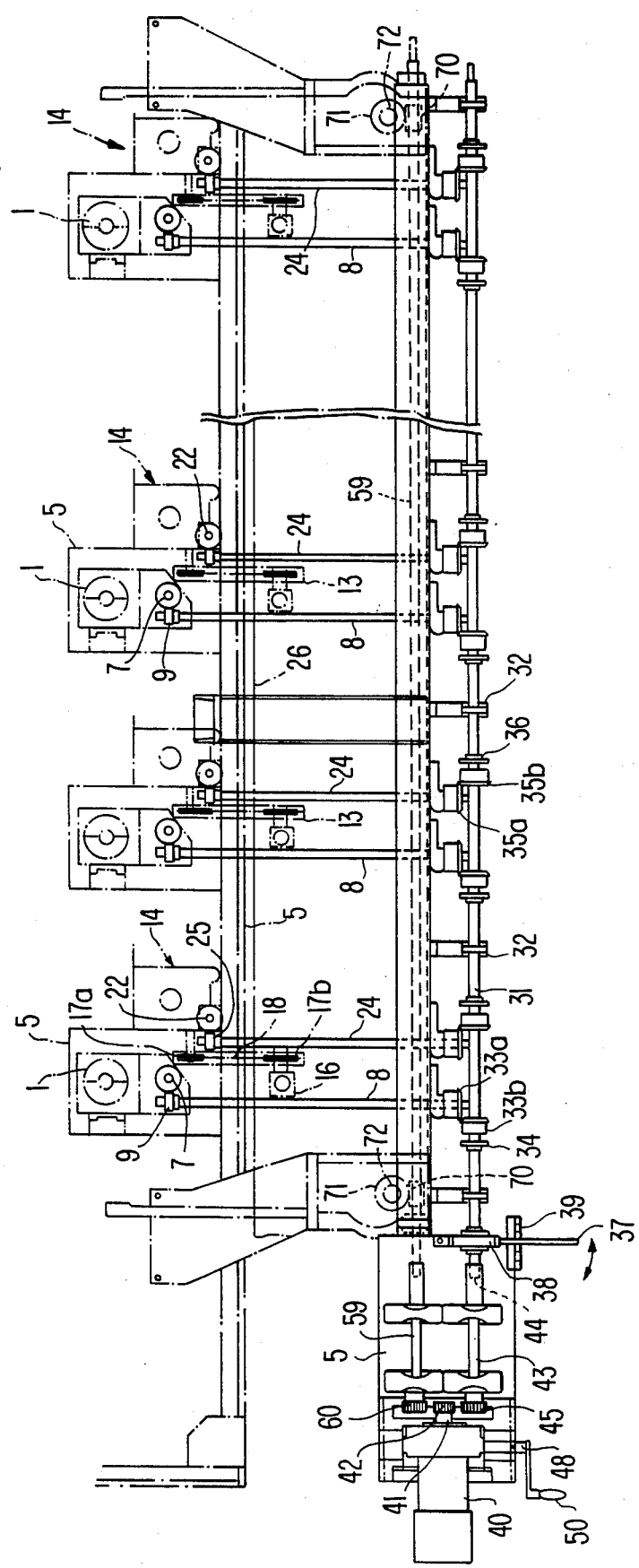
FIG. 1 is a plan view of the principal parts of the bottle manufacturing apparatus.
Figure 2:
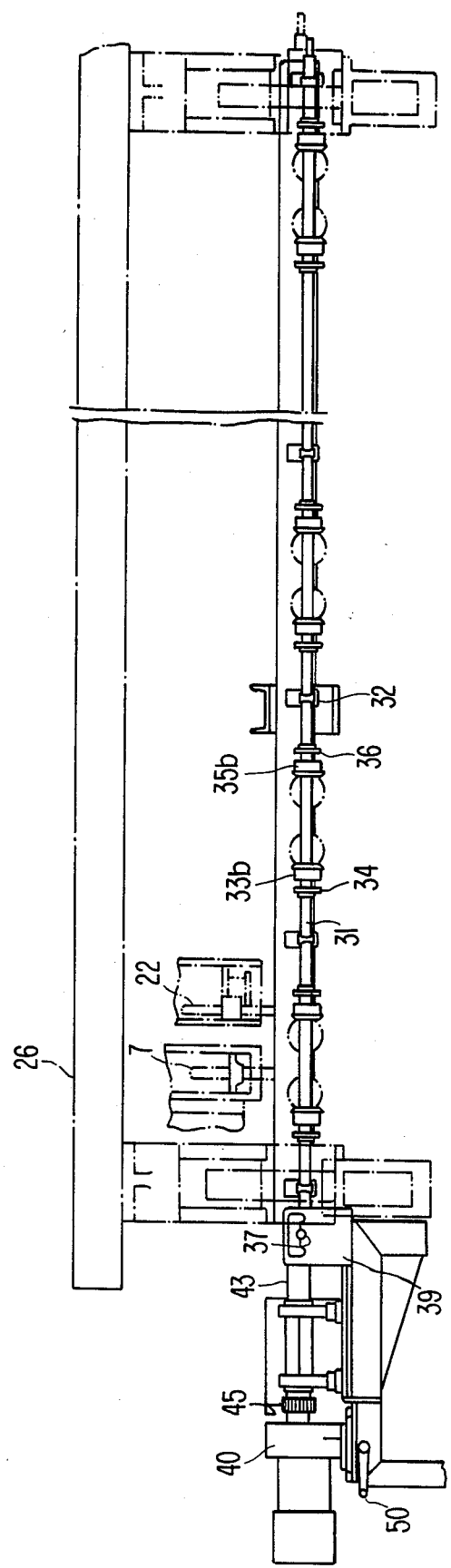
FIG. 2 is a front view thereof.
Figure 3:
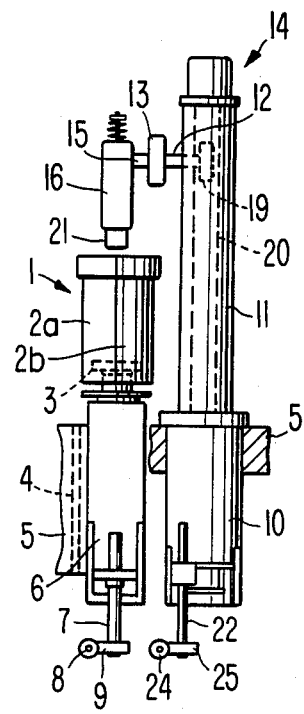
FIG. 3 is a front view of a blow mold and a take-out mechanism.
Figure 5:
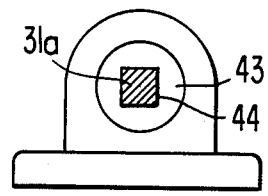
FIG. 5 is a sectional view of a driving shaft portion.
Figure 4:
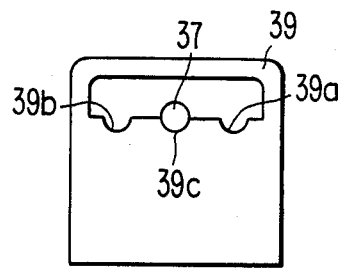
FIG. 4 is a front view of a holder of a lever.

As shown in FIG. 10, said clutches 34 and 36 are fixedly mounted on the driving shaft 31 in slightly spaced apart relation from the bevel gears 33b and 35b and a spring 56 is disposed between each of the bevel gears 33b and 35b and the respective clutches 34 and 36. The clutches 34 and 36 are provided with a plurality of engaging holes 57 extending parallel to the driving shaft 31 and at regular intervals around the circumference thereof with the center of the driving shaft 31 as a center. In the preferred embodiment, twenty engaging holes 57 are provided. The bevel gears 33b and 35b are each provided with at least one, in the preferred embodiment just one, engaging pin 58 projecting therefrom toward the respective clutches 34 and 36 and insertable into the engaging holes 57. Referring to FIGS. 1 and 2, when the lever 37 is put in the recess 39c of the holder 39, the clutches 34 and 36 are in a neutral position in which they are spaced from the respective bevel gears 33b and 35b. Upon putting the lever 37 in the recess 39a, the clutches 34 are brought into contact with the bevel gears 33b. At this time, the engaging pins 58 are inserted into the engaging holes 57 and the rotation of the driving shaft 31 is transmitted to the bevel gears 33b through the clutches 34. In addition, since the engaging pins 58 are held by a spring (not shown), in the event that the position of the engaging pin 58 is not exactly matched to that of an engaging hole 57 when a clutch 34 is brought into contact with a bevel gear 33b, the head portion of the engaging pin 58 is pressed by the bevel gear 33b, whereby the engaging pin 58 is sunk into the clutch 34. When the clutch 34 is slightly rotated by the driving shaft 31, the position of the engaging pin 58 comes to coincide with that of the engaging hole 57, the engaging pin 58 is projected into the engaging hole 57, so that the engagement of a clutch 34 with the corresponding bevel gear 33b as well as the sliding of the driving shaft 31 by means of the lever 37 can be smoothly carried out. Products on the market, for example a spring plunger Model SP-12-3-R manufactured by JIEC Industries, Inc., can be used for the engaging pin 58.

As shown in FIGS. 1 and 11, a conveyor adjusting drive shaft is mounted on the body 5 of the apparatus substantially parallel to the driving shaft 31 for adjusting the up and down position of the conveyor device 26. The shaft 59 is provided with a driven gear 60 at an end portion thereof which is engageable by the driving gear 42, the driving gear 42 being capable of being engaged with and disengaged from the driven gear 60 by the movement of the motor 40. At each end of the apparatus is a conveyor height adjusting means constructed by a worm gear 70 fixedly mounted on the shaft 59 and engaged with a worm wheel 71. The worm wheel 71 has a threaded hole therethrough in which is threadedly engaged a threaded shaft 72. The shaft 72 is fixedly mounted on a supporting member 73 on which the conveyor device 26 is supported. Upon rotating the shaft 59, the worm 70 and the worm wheel 71 are rotated, whereby the threaded shaft 72, which is engaged with the worm wheel 71, is moved up and down. Accordingly, a supporting member 73 fixedly mounted on the threaded shaft 72 and the conveyor device 26 supported thereon are moved up and down.

With the above described construction, when a blow mold 1 is changed and the height of the bottom plate 3 thereof and the bottle take-out mechanism 14 must be adjusted, the threaded shaft 48 is rotated by means of the handle 50 to move the motor 40 toward the position of the driving shaft 31 for engaging the driving shaft gear 42 with the driven gear 45, and the lever 37 is moved in the direction away from the motor 40, whereby the bevel gears 33b are engaged with the driving shaft 31 through the clutches 34, and then the lever 37 is put in the recess 39a of the holder 39. The driving shaft 31 is thus rotated in the desired rotational direction by the motor 40 to rotate the operating shafts 8 through the bevel gears 33b and 33a, the operating shafts 8 rotating the rotary driving mechanism 9, thereby moving the bottom plates 3 in the up or down direction by movement of the bracket 6 to adjust the height of the bottom plate 3 to that of the parts 2a and 2b of the new mold.

Subsequently, the lever 37 is moved toward the motor 40 to engage the bevel gears 35b with the driving shaft 31 through the clutches 36 and the lever 37 is placed in the recess 39b of the holder 39. Then, the driving shaft 31 is rotated in the desired direction by the motor 40 to rotate the operating shafts 24 through the bevel gears 35b and 35a, thereby rotating operating shafts 22 and the rotary driving mechanisms 25 for moving the take-out mechanisms 14 in the up or down direction to adjust the height of the tongs 21 to that of the bottle in the new blow mold 1. After the adjustment is finished, the lever 37 is moved to the neutral position in recesss 39c. Then the driving gear 42 of the motor 40 is disengaged from the driven gear 45 by rotation of the handle 50. In the above described adjustment operation, a plurality of operating shafts 8 and operating shafts 24 are simultaneously rotated, but when the lever 37 is in a neutral position, that is the lever 37 is in the recess 39c, the operating shafts 8 and 24 can be individually rotated in the same manner as in the conventional apparatus, so that a fine regulation can also be carried out to bring the bottom plates and tongs exactly to the desired positions.

In the event that it is required to adjust the height of the conveyor device 26 as well as that of said bottom plates 3 and said take-out mechanisms 14, the motor 40 is moved by operating the handle 50 to a position to engage the driving gear 42 thereof with the driven gear 60, thereby rotating the shaft 59 by the motor 40. Thereupon, the shaft 59 rotates the worms 70 and the worm wheels 71, whereby the threaded shafts 72 can be moved up and down together with the supporting member 73 and the conveyor device 26 to adjust the height of the conveyor device 26 to that of the take-out mechanism 14, whereby bottles held between the tongs 21 can be stably placed on the conveyor device 26.

As above described, according to the present invention the operating shafts for adjusting the height of the bottom plates and the operating shafts for adjusting the height of the take-out mechanisms are each alternately rotated by means of one driving shaft, and the driving shaft is driven by a single motor. Accordingly, the switching-over operation of the motor can be carried out without entering the space under the conveyor at all, so that the height adjustment of the bottom plates and the take-out mechanisms can be visually, easily and accurately carried out. Thus the operation of the apparatus is remarkably improved and accurate height adjustment can be achieved. In addition, since it is only necessary for the change-over between the height adjustment of the bottom plates and the height adjustment of the take-out mechanisms to slide the driving shaft by means of the slide means, the operation of the bottle manufacturing apparatus according to the present invention is easy and efficient.

Moreover, in a bottle manufacturing apparatus provided with a plurality of operating shafts for the bottom plates and a plurality of operating shafts for the take-out mechanisms, they can be simultaneously rotated to adjust the height of the respective parts. Accordingly, the time required for the adjustment of a bottom plate and a take-out mechanisms in a bottle manufacturing apparatus provided with many sections can be remarkably shorter than that required for one section and the time required for exchanging a mold in the bottle manufacturing apparatus can be remarkably shortened, thereby increasing bottle manufacturing efficiency.

What is claimed is:
1. A bottle manufacturing apparatus comprising:
   a plurality of exchangable blow molds each having a bottom plate;

a plurality of take-out mechanisms for taking a bottle formed in a corresponding blow mold out of the blow mold;

bottom plate height adjusting means for each of said blow molds and each having an operating shaft for driving said height adjusting means;

take-out mechanism height adjusting means for each of said take-out mechanisms and each having an operating shaft for driving said height adjusting means;

a single driving shaft rotatable in opposite directions to first and second driving positions; and a plurality of rotating driving mechanisms connected between said driving shaft and the respective operating shafts said driving mechanisms being in disengaged condition when said driving shaft is in a neutral position, and the driving mechanisms for the operating shafts of said bottom plate height adjusting means being engaged when said driving shaft is in the first driving position and the driving mechanisms for the operating shafts of said take-out mechanism height adjusting means being engaged when said driving shaft is in the second driving position.

2. A bottle manufacturing apparatus as claimed in claim 1 in which said rotating driving mechanisms each comprises a first bevel gear on the operating shaft, a second bevel gear idly rotatably mounted on said driving shaft and engaged with said first bevel gear, and a clutch mounted on said driving shaft which is engaged with said second bevel gear when said driving shaft is in one of the first and second driving positions.

3. A bottle manufacturing apparatus as claimed in claim 1 in which said driving shaft is shiftable between said neutral position and said driving positions by movement in the direction of the length of said driving shaft, and further comprising a reversible motor having means for connecting it to said driving shaft, said connecting means including a joint between said driving shaft and said connecting means permitting sliding movement of said driving shaft.

4. A bottle manufacturing apparatus as claimed in claim 3 further comprising:

conveyor means extending past said take-out mechanisms and having means for adjusting the height thereof;

a conveyor adjusting drive shaft coupled to said height adjusting means for said conveyor means; and means for disengaging said reversible motor from said driving shaft and engaging it with said conveyor adjusting drive shaft for adjusting the height of said conveyor means.

5. A bottle manufacturing apparatus as claimed in claim 4 in which said means for disengaging and engaging said motor comprises a support plate on which said motor is mounted, said support plate being movably mounted on said apparatus for movement transverse to the axes of said driving shaft and said conveyor adjusting drive shaft, said motor having a shaft with a drive gear thereon, and said driving shaft and said conveyor adjusting drive shaft each having a driven gear on the end thereof adjacent said motor, and means for moving said support plate back and forth.

6. A bottle manufacturing apparatus comprising:

a plurality of exchangable blow molds each having a bottom plate and a bracket on which said bottom plate is mounted;

a plurality of take-out mechanisms for taking a bottle formed in a corresponding blow mold out of the blow mold;

bottom plate height adjusting means for each of said blow molds and each having a threaded shaft for moving said bracket up and down and operating shaft for driving said threaded shaft;

take-out mechanism height adjusting means for each of said take-out mechanisms and each having a threaded shaft for moving said take-out mechanism up and down and an operating shaft for driving said threaded shaft and extending parallel to the operating shafts for said bottom plate height adjusting means;

a single horizontal driving shaft rotatable in opposite directions and extending perpendicular to said operating shafts and shiftable in the direction of the length of said driving shaft between a neutral position and first and second driving positions;

a plurality of rotating driving mechanisms connected between said driving shaft and the respective operating shafts and each having a first bevel gear fixed on the corresponding operating shaft and a second bevel gear idly rotatably mounted on said driving shaft and engaged with the first bevel gear, and a clutch mounted on said driving shaft which is engaged with said second bevel gear when said driving shaft is in a driving position, said clutches being engaged with the first bevel gears on the operating shafts for the bottom plate height adjusting means when said driving shaft is in the first driving position and being engaged with the first bevel gears on the operating shafts for said take-out mechanism height adjusting means when said driving shaft is in the second driving position;

a reversible motor having means for connecting it to said driving shaft, said connecting means including a joint between said driving shaft and said connecting means permitting sliding movement of said driving shaft; and driving shaft sliding means engaged with said driving shaft for sliding it between said neutral and said driving positions.

* * * * *